United States Patent [19]
Schwarz

[11] Patent Number: 4,716,736
[45] Date of Patent: Jan. 5, 1988

[54] METAL ASSISTED CARBON COLD STORAGE OF HYDROGEN

[75] Inventor: James A. Schwarz, Fayetteville, N.Y.

[73] Assignee: Syracuse University, Syracuse, N.Y.

[21] Appl. No.: 819,844

[22] Filed: Jan. 17, 1986

[51] Int. Cl.[4] .............................................. F17C 11/00
[52] U.S. Cl. ............................................ 62/48; 34/15; 165/104.12; 206/0.7; 423/248; 423/644
[58] Field of Search ...................... 62/11, 48; 206/0.7; 34/15; 423/248, 644 R; 165/104.12

[56] References Cited

U.S. PATENT DOCUMENTS

| | | | |
|---|---|---|---|
| 3,300,992 | 1/1967 | Hager et al. | 62/48 |
| 3,732,690 | 5/1973 | Meijer | 123/1 A |
| 4,165,569 | 8/1979 | Mackay | 62/48 |
| 4,249,654 | 2/1981 | Helversen | 62/48 |
| 4,375,257 | 3/1983 | Bruning et al. | 62/48 |
| 4,433,063 | 2/1984 | Bernstein et al. | 62/48 |
| 4,489,564 | 12/1984 | Hausler et al. | 62/48 |

Primary Examiner—Ronald C. Capossela
Attorney, Agent, or Firm—Bruns and Wall

[57] ABSTRACT

Hydrogen is stored at cold temperatures (room temperature to liquid nitrogen temperature) by sorption in a high unit surface area activated carbon storage medium. A minor amount of a transition metal is dispersed in the carbon, and this significantly increases the hydrogen occupancy of the available storage sites on the carbon. In a favorable embodiment, the storage medium is activated so as to maintain a quantity of water, which acts as a co-catalyst to further enhance the quantity of hydrogen that can be stored.

29 Claims, 8 Drawing Figures

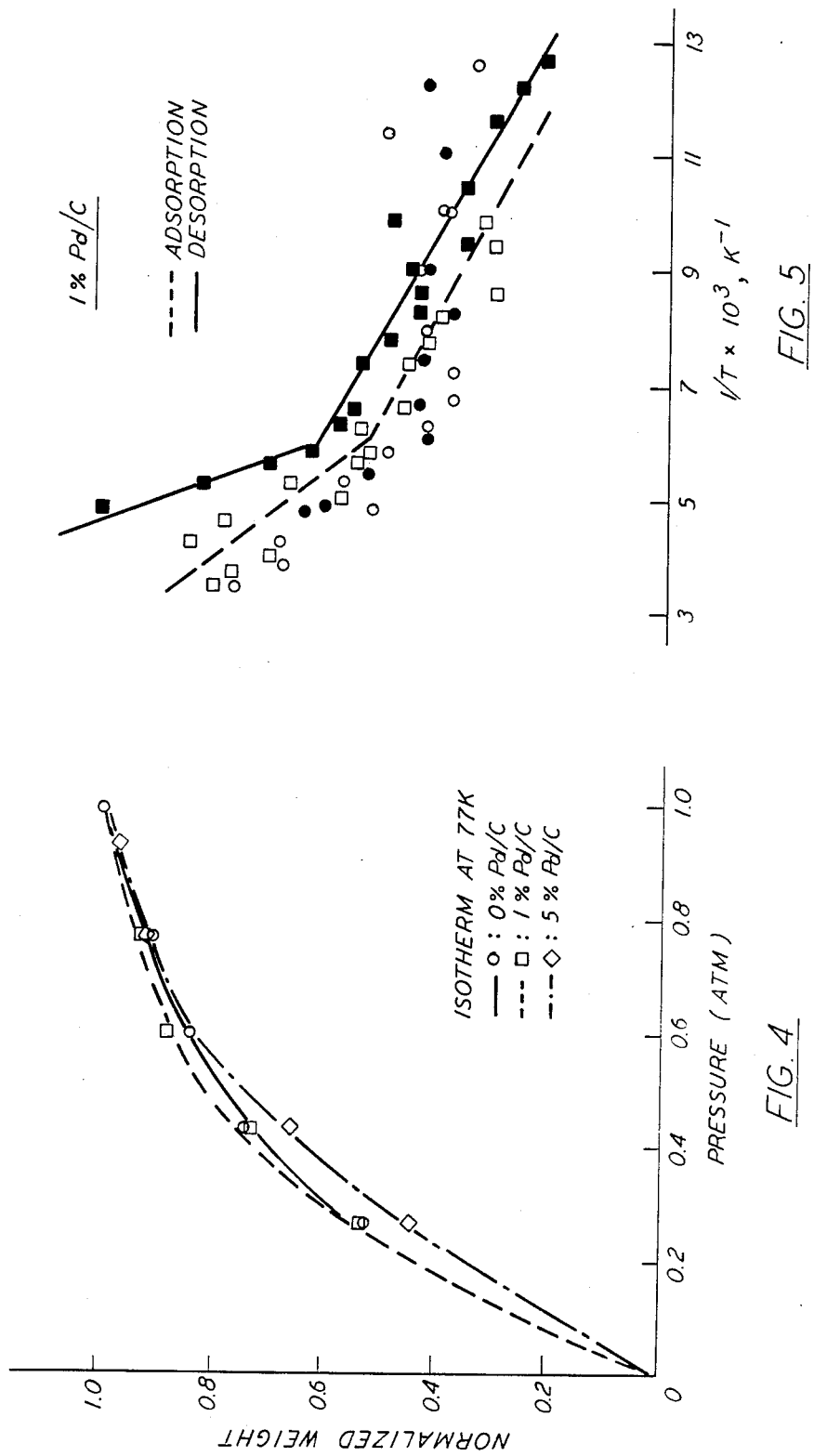

METAL ASSISTED CARBON COLD STORAGE OF HYDROGEN

BACKGROUND OF THE INVENTION

This invention relates to vessels and the like for storing hydrogen, and is especially directed to a method and apparatus for storing hydrogen in high surface area activated carbon that has been combined with a minor amount of a transition metal.

Hydrogen has become increasingly attractive as a secondary energy source as the price of petroleum increases and its availability wanes. Hydrogen is particularly interesting as a secondary fuel because it has the highest energy density per unit weight of any chemical fuel, because it can be easily produced by electrolysis of water, and because it can be used directly in a variety of energy converters from turbines and reciprocating internal combustion engines to fuel cells.

Unfortunately, hydrogen is a highly volatile fuel, and its storage in sufficient quantities has been a major stumbling block to implementation of a hydrogen-based energy storage system. Consequently, a great deal of effort has been directed towards economical storage of significant quantities of hydrogen for use as a fuel in a vehicle or in a fixed station environment.

Currently, four principal methods have been proposed for the storage of hydrogen. These include the following:

pressurization of hydrogen and storage in high-pressure vessels;

liquefaction of the hydrogen and storage at cryogenic temperatures, e.g., in a dewar vessel;

storage of the hydrogen as a metal hydride; and cryogenic storage of the hydrogen in high surface area activated carbons.

Metal hydride storage is discussed, for example in U.S. Pat. Nos. 4,358,316 and 4,446,101, while cryogenic storage in activated carbon is discussed in C. Carpetis and W. Peschka, A Study of Hydrogen Storage by Use of Cryoadsorbents, Int. J. Hydrogen Energy, U.S. pp. 539–544, 1980.

Because energy costs of liquefying the hydrogen are avoided, cryogenic storage of hydrogen on activated carbon is considered a cost-effective storage mechanism. However, this method does have certain drawbacks, including low storage capacity per kilogram of storage medium, the need to maintain cryogenic temperatures, and the need for a pressure vessel containing the carbon storage medium to withstand high pressures, e.g., 50 to 70 atmospheres.

Consequently, there has been a strong interest in finding ways to increase the storage capacity of the material, and to store significant quantities of the hydrogen at cold, rather than cryogenic temperatures, and to store the hydrogen at pressures significantly lower than those currently employed.

OBJECTS AND SUMMARY OF THE INVENTION

Accordingly, it is an object of this invention to provide storage of hydrogen in a high surface area activated carbon substrate, that is improved to achieve a significant increase in the amount of hydrogen that can be stored in the activated carbon, and to carry out the storage at relatively higher temperatures and lower pressures than previously practicable.

It is another object of this invention to provide procedures for activation of the storage material to maximize the amount of hydrogen that can be stored thereon.

In accordance with an aspect of this invention, hydrogen is stored in a storage medium that consists basically of a high surface area activated carbon and a transition metal (1% to 5% by weight) dispersed on the activated carbon. The storage of the hydrogen can involve chilling the gas to a cold temperature range, as distinguished from cryogenic temperatures, and can involve operating the storage system at pressures from one atmosphere to 50 atmospheres, but optionally at about 42 atmospheres. By transition metals is meant the Group VIII metals, and such other metals that will effectuate the effect described below.

The inclusion of a minor amount of a transition metal, such as Pd, Pt, or Ni, leads to a significant increase over the amount of hydrogen that can be stored on activated carbon alone. This technique is referred to as Metal-Assisted Cold Storage or MACS, and the amount of stored hydrogen increase far exceeds the amount that would be expected due to sorption on the transition metal. It is believed that this occurs when the transition metal dissociates the gaseous hydrogen into monatomic hydrogen, and the latter spills onto the carbon substrate. The activated form of hydrogen thus produced is more efficient at filling the available sites on the activated carbon.

When the gaseous hydrogen is brought into contact with an active transition metal, hydrogen molecules are adsorbed onto the surface of the metal, and some of these molecules dissociate into hydrogen atoms. When the metal is dispersed as small (50 Å to 200 Å) particles on a high surface area support matrix such as activated carbon, the monatomic hydrogen species spills onto nearby sites on the support matrix, and becomes adsorbed thereon. One example of a medium formed of a palladium dispersion on an activated carbon base is given in U.S. Pat. No. 3,138,560, although that patent contains no suggestion that the carbon-palladium material thereof could be used as a hydrogen storage medium.

It has been determined experimentally that the hydrogen uptake capacity is also increased if the carbon is somewhat basic, i.e., having a pH above 7.0, with significantly improved performance for a pH between about 8.0 and 11.0. The pH is measured by dispersing about 200 mg of carbon in about 30 ml of distilled water and then agitating the suspension for about 10 minutes. The suspension is allowed to settle and the liquor's pH is measured using a suitable meter. The storage capacity is increased with increasing pH, a pH of 9 to 10 indicating a significant increase in terms of grams H per kilogram carbon.

Superior carbons for this application are those produced by Northern American Carbon Corp. and those produced by Englehard Industries, Inc., both of which have high unit surface area factors (greater than 1000 $m^2/g$), and both of which are at least slightly basic (Englehard Industries' sample had a pH=7.08, North American Carbon's sample had a pH=9.08).

These carbons have great porosity, and readily accept the dispersion of palladium, platinum, nickel or other transition metal, the metal being dispersed as tiny microcrystals throughout the carbon, as opposed to existing as a surface coating. The transition metals are not themselves specifically active chemically, as to not disturb the hydroxyl, aldehyde, carbonyl, carboxyl, or other active groups that are present on the surface of activated carbon. It is believed that these active groups play an important role in the adsorption of the dissociated hydrogen.

The concept of MACS, while verified experimentally for Pd/C and Pt/C examples is not limited only to those examples. More generally, there must be a hydrogen acceptor and the dispersed metal or other compound or agent for dissociation of the hydrogen, the acceptor being capable of chemisorbing or physisorbing the dissociated hydrogen. These metals and acceptors may be mixed within one another, or the dispersed metal may be supported on the surface of the hydrogen acceptor. Alternatively, the metal and acceptor can be physically separate, with the metal being supported on a substrate with which the dissociated hydrogen does not produce any noticeable effect. In this case the hydrogen atoms reach across the substrate from the metal to the acceptor. Accordingly, the dissociating agent can, e.g., be any transition metal—Pd, Pt, Ni, or, alternatively, a metal selected from the family Fe, Ru, Os or Co, Rh, Ir—which can dissociatively adsorb a hydrogen molecule; the acceptor can be any substance that has active sites for hydrogen adsorption, such as activated carbon, zeolite (sodium aluminosilicate), aluminum oxide, silicon dioxide, and other examples. In short, the acceptor substance should be an inert support substance that can be activated and that can contain a dispersed transition metal.

The MACS system should be properly prepared by a suitable activation procedure to ensure maximal uptake capacity for hydrogen sorption. As the MACS initially contains moisture and metal oxides, dehydration and reduction of the MACS storage medium should be carried out before the medium is employed for hydrogen storage. However, during activation it is necessary to establish and maintain an optimum activation temperature that will not damage the intrinsic properties and structure of the MACS storage medium. Experimental results indicate that the activation temperature should not exceed about 373 K. for the reduction phase of activation, as higher temperatures can reduce the medium's adsorption capacity for hydrogen.

It has also been indicated experimentally that the transfer of hydrogen atoms from the metal to the carbon is enhanced by the presence of a co-catalyst, and the extent of this enhanced transfer increases with increased proton affinity of the co-catalyst. It is well known that water shows a larger co-catalytic effect than simple organic alcohols. It is believed that water as a co-catalyst reacts with hydrogen to form a solvated proton on the metal, and the proton is then transported in the adsorbed phase of the co-catalyst to active sites on the carbon support, where the proton is released and adsorbed as a hydrogen atom. To take advantage of this phenomenon, an activation procedure of this invention has been developed in which the oxidized dispersed metal is reduced and at the same time some water is entrained in the storage medium as a promoter for the enhancement of hydrogen sorption. To achieve this, the activation reduction procedure is carried out in static hydrogen at atmospheric pressure.

The above and other objects, features, and advantages of this invention will become more apparent from the ensuing description of preferred embodiments of the invention, with reference to the accompanying drawings.

BRIEF DESCRIPTION OF THE DRAWINGS

FIGS. 2, 3, 4, 5, 6 and 7 are graphs for explaining the operation and advantages of the MACS system of this invention.

DETAILED DESCRIPTION OF THE PREFERRED EMBODIMENT

Figure 1:
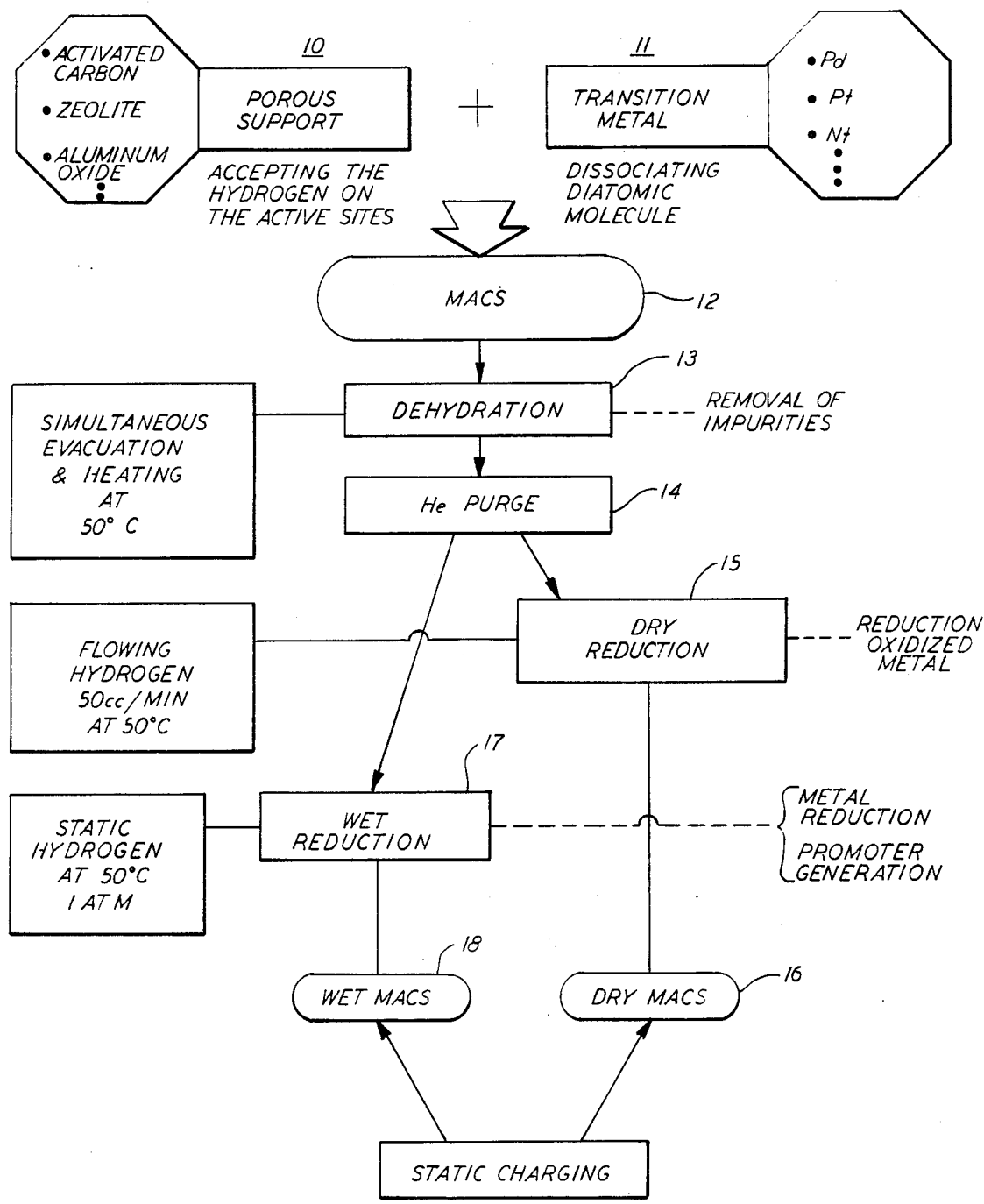
FIG. 1 is a flow chart of MACS activation and storage procedures according to this invention.

The preparation and activation of a Metal Assisted Cold Storage or MACS medium for the storage of hydrogen is illustrated in FIG. 1.

Initially, a porous support 10, which can, e.g., be activated carbon, zeolite, aluminum oxide, or any other suitable hydrogen adsorbent (or absorbent) material, with a suitably high surface area factor, is treated by dispersing a suitable transition metal 11 thereon to form a resulting MACS structure 12. The metal can be a transition metal from Group VIII, and can be selected from the family Ni, Pd, Pt; Co, Rh, Ir; or Fe, Ru, Os. The MACS storage medium 12 is placed in a suitable refrigerable pressure vessel, and is prepared or activated by carrying out dehydration and reduction.

A dehydration step 13 removes impurities, principally moisture, from the MACS storage medium 12. Here evacuation with moderate heat (323 K.) application has been found to be effective. Selection of an optimum temperature is critical in dehydration as well as in reduction. In order to preserve the activity and the intrinsic sorptive properties of a carbon/transition-metal MACS medium, a temperature below 373 K. should be observed. Normal dehydration temperature is 323 K. The evacuation and heating cycle is carried out for several hours, and preferably overnight.

At this point, an inert-gas purge step 14 is carried out. Here, after the evacuation step, helium gas is introduced and is flow cycled through the MACS vessel until the weight of the MACS material is determined to be constant. The temperature during the helium purge is also held at 323 K. Then, the vessel is again evacuated, and the reduction phase, which can be either dry reduction or wet reduction, is carried out.

Reduction is an important step in activation procedures for hydrogen sorption and transfer because it restores the power of the metal particles, which have been allowed to oxidize in the open air.

If a dry reduction step 15 is desired after the heat is removed following evacuation, hydrogen is introduced at room temperature at a rate of 50 cc/minute to reduce the metal particles. The system is heated after this step and maintained at 323 K. until the weight remains constant.

A MACS storage medium formed of metal on activated carbon heated above 373 K. can cause catalyst sintering (massive growth of the metal particles) with the possibility of pore blocking. Thus the full potential of MACS systems can be achieved by treatment at temperatures lower than 373 K.

This reduction in flowing hydrogen is called dry reduction because the water produced is removed during the reduction phase. The material treated as described above is called "dry MACS" 16.

If a wet reduction step 17 is followed, the reduction is carried out under quiescent conditions, i.e., using static hydrogen at atmospheric pressure. Wet reduction entrains some water as a promoter which enhances the transfer of hydrogen. Water is a reduction product, and the water has a co-catalytic effect on the enhancement of hydrogen transfer from the metal to the carbon. The temperature for this phase is also maintained at 323 K. The material treated in wet reduction is called "wet MACS" 18.

The reduction phases 15 or 17 in the activation of the MACS storage medium are critical to maximize hydrogen storage and release. Weight loss during the reduction is related to the reaction for Pd/carbon MACS:

$$PdO_2 + H \rightarrow Pd + H_2O$$

For example, the results of a typical reaction of a 1% Pd/carbon catalyst are presented as follows:
- weight of dry MACS = 55.96 mg
- weight of dry MACS after reduction = 55.872 mg
- weight loss on reduction = 0.088 mg The theoretical weight loss expected based on above reaction can be determined for a 1% Pd/carbon MACS storage medium as follows:
- weight of palladium = 55.96 × 0.01 = 0.56 mg
- mg moles of palladium = 0.56/107.7 = 0.0053 mg moles
- mg atoms of oxygen = 0.0053 mg moles
- weight of oxygen removed = 0.0053 × 16 = 0.084 mg It can be seen that both theoretical and experimental weight losses are equal. Thus reduction is substantially completed even at 323 K. At the same time, the carbon alone does not change in weight during the reduction phase.

The enhancement in hydrogen storage capacity on dry MACS, relative to storage on activated carbon, has been observed. Here hydrogen is charged (step 19) onto the MACS material at low temperatures. An enhancement of 7% in the hydrogen storage capacity on dry MACS was observed at liquid nitrogen temperature compared to carbon alone (see Table I). The hydrogen was 100% recoverable. The amount of metal loading has no significant influence, although dry platinum-MACS shows higher enhancement than dry palladium-MACS by 5%. At an elevated temperature (85 K.) there was 8.5% enhancement on dry MACS, as compared to carbon alone.

Wet MACS storage medium 18 also shows considerable enhancement for hydrogen storage. With water acting as a promoter, more hydrogen is adsorbed on the wet MACS than on the dry MACS.

Figure 2:
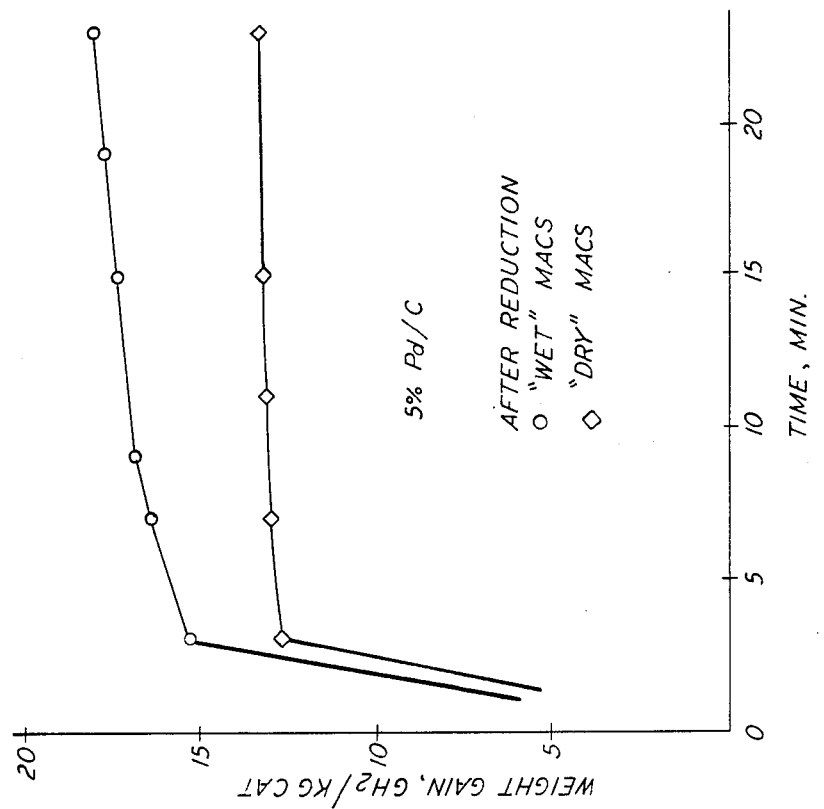

The amount of hydrogen uptake on wet MACS is a function of charging time. The relationship of hydrogen uptake to charging time for wet and dry 5% Pd/C MACS is shown in FIG. 2. Hydrogen continues to be adsorbed on the wet MACS even after the temperature reaches an equilibrium value, whereas hydrogen adsorption on dry MACS stops at that equilibrium value. For four hour charging times on wet MACS, 40% more hydrogen is adsorbed at 77 K. At 85 K., there was 20% enhancement after 20 minutes of charging.

It was observed in experiments that the rate of hydrogen adsorption, after the temperature of the MACS medium reaches its equilibrium value, remains constant regardless of metal loading, Table-3 shows that similar amounts of water per unit weight of the MACS (about 0.5 gm to 0.6 gm water/kg MACS) are entrained, although the amount of water produced during the wet reduction depends somewhat on the metal loading.

The rate of hydrogen adsorption on wet MACS at equilibrium is fairly constant. This indicates that there are more active sites available on the support than are used in dry MACS or carbon storage systems, and thus much more hydrogen can be adsorbed. Table-4 shows that the activated carbon has a total unit surface area factor of 1167 m$^2$/g which corresponds to 5.75×10$^{25}$ active storage sites for each kilogram of MACS material, and that the total number of sites required to accommodate hydrogen in an adsorbed monolayer is 7.46×10$^{24}$ sites/kg of MACS.

The water seems to function as a "bridge" by which heat transfer as well as mass transfer is enhanced. The water effect on wet MACS systems makes it more practicable if one employs cold temperatures (between 78 K. and room temperature) rather than cryogenic temperature (below 78 K.) for charging of the MACS with hydrogen.

Figure 3:
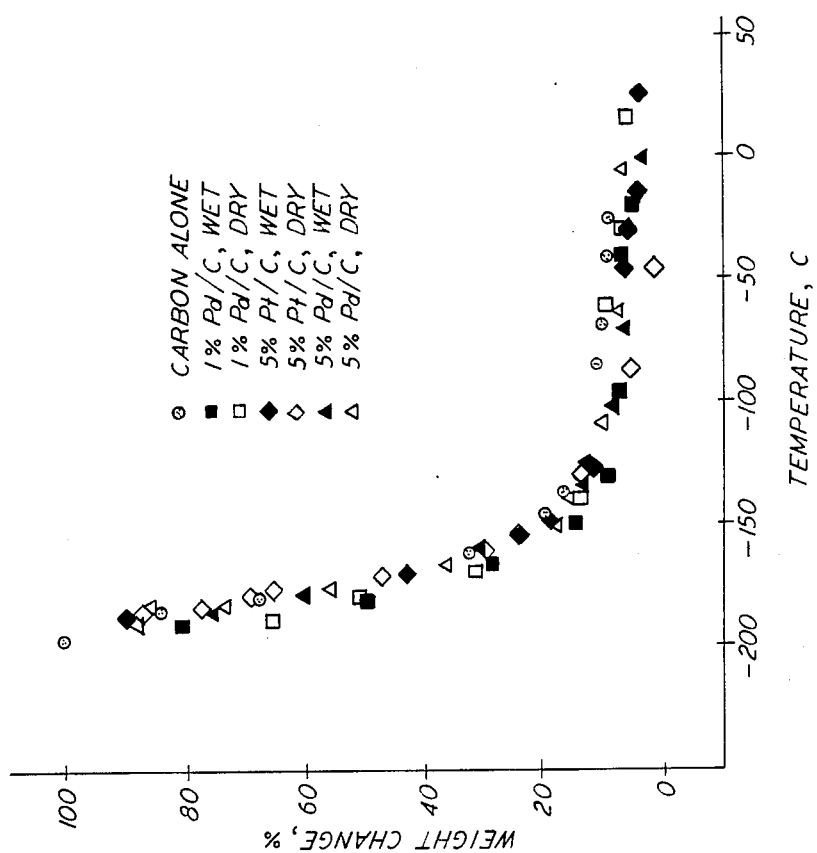

The kinetics of adsorption/desorption of hydrogen on the MACS storage medium can be explained with reference to FIG. 3, which is a normalized plot, depicting hydrogen uptake as a function of temperature while the charging pressure was maintained at a constant one atmosphere. FIG. 4 is also a normalized plot showing the dependence of adsorbed hydrogen uptake on pressure at 78 K. All the tested MACS storage media adsorb comparable percentages of hydrogen at a given temperature and pressure. The similarity in the shape of the isotherms indicates that all MACS materials have similar kinetics and that the difference in total hydrogen uptake is principally due to the effect of the transition metal, which alters only the activation energy barrier but not the reaction kinetics.

If we consider Langmuir's postulate, for a single gaseous component, A, surface adsorption may be represented by the following mechanism:

$$A + S \underset{k_d}{\overset{k_a}{\rightleftharpoons}} A \cdot S \qquad (1)$$

The rate of adsorption can be written as:

$$r_a = k_a[A][S] - k_d[A \cdot S] \qquad (2)$$

For complete monolayer coverage, the above equation can be expressed as $$r_a = k_a[A]\{[M] - [A \cdot S]\} - k_d[A \cdot S] \qquad (3)$$

where [A] and [S] denote the concentration of the component and sites, respectively, [A·S] denotes the concentration of occupied sites, and [M] is the maximum concentration of available sites. Adsorption and desorption rate constants $k_a$ and $k_d$, respectively, for the single gaseous component normally follow the Arrhenius functionality relations given by $$k_a = A_a \exp(-E_a/RT) \qquad (4)$$

$$k_d = A_d \exp(-E_d/RT) \qquad (5)$$

Where R is the gas constant, T is in degrees K., and $E_a$, $E_d$, $A_a$, and $A_d$ are as given in Table-5. During charging experiments, the adsorption of hydrogen is irreversible, thus equation (3) becomes $$r_a = k_a \times \text{function (concentration)} \qquad (6)$$

Weight gain/loss due to adsorption/desorption can be obtained by linearly programming the temperature down from room temperature to 77 K. Then the adsorption rate is given by $$r_a = W/dt = (dW/dT)(dT/dt) = b(dW/dt) \tag{7}$$

where b is the cooling rate.
We can rewrite the equation (7) as $$r_a = b(dW/dT) = A_a \exp(-E_a/RT) \tag{8}$$

where, for the conditions described, $A_a$ is a constant with units of mole/second.

The basis for determining the desorption kinetics follows a parallel methodology to that used to obtain the adsorption kinetics.

Examples of carbon storage and Pd/C MACS media are as follows:

I. 0% Pd/C = Unmetallized carbon;
II. 1% Pd/C = Activated carbon with a dispersion of 1% by weight of palladium metal;
III. 5% Pd/C = Activated carbon with a dispersion of 5% by weight of palladium metal.

The basis carbon was the Engelhard Carbon product mentioned above. These were pretreated in identical manners as dry MACS and as wet MACS. A comparison of these examples will be made with reference to the Tables and to the charts of the Drawings.

Figure 6:
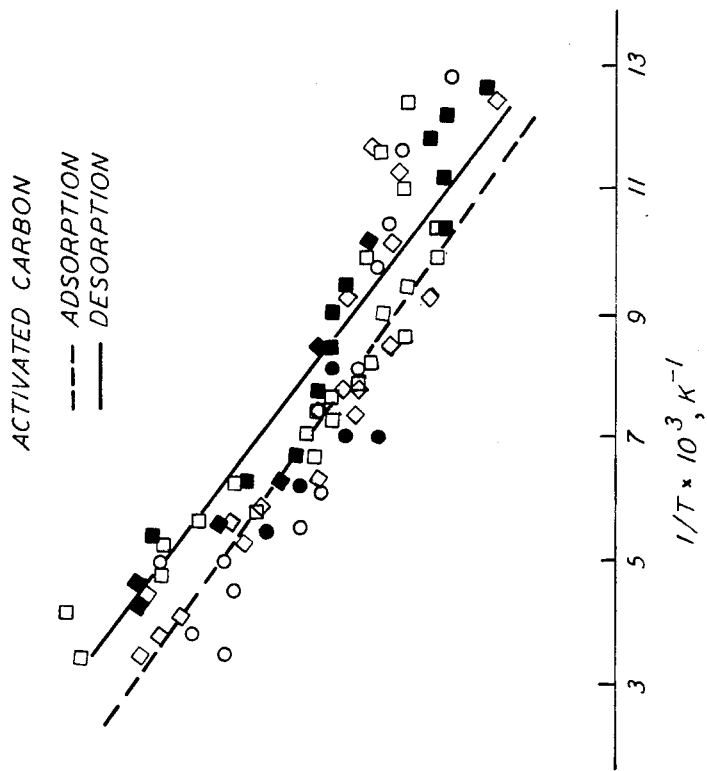

FIGS. 5 and 6 are Arrhenius plots of the adsorption/desorption rates for 1% Pd/carbon and carbon, respectively. What emerges from these results is the existence of two regions in the Arrhenius plot of 1% Pd/carbon corresponding to an initial slower hydrogen uptake followed by a more rapid hydrogen uptake. Between 77 K. and 173 K. and between 173 K. and 273 K. there are two linear regions which indicate two binding states for hydrogen on MACS material. For activated carbon alone (FIG. 6) only a single linear region is seen. Table 5 summarizes the kinetic parameters $E_a$, $E_d$, $A_a$, and $A_d$ over two temperature ranges for the adsorption/desorption processes.

Figure 7:
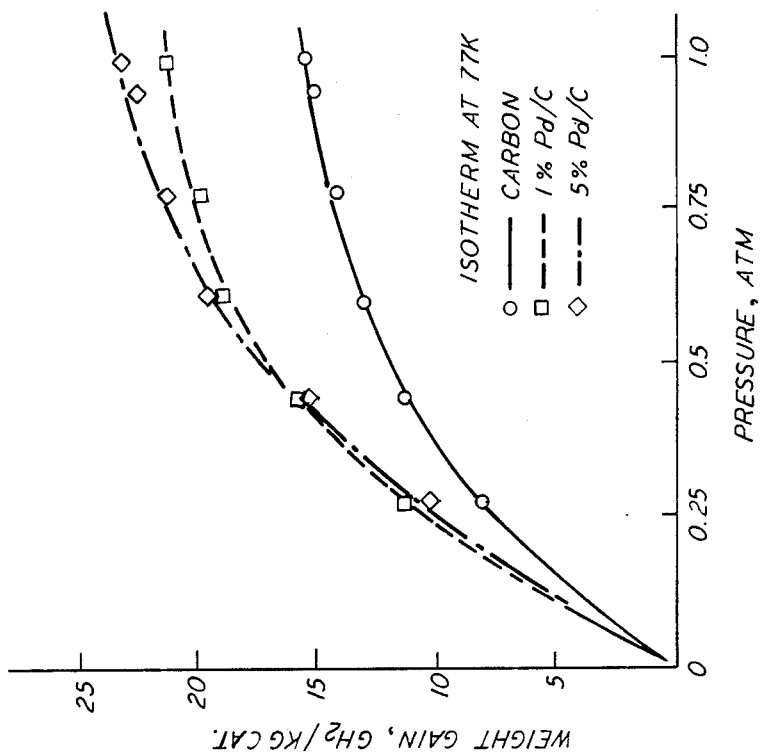

As is apparent from the chart of FIG. 4, pressure drives the hydrogen adsorption. FIG. 7 shows the absolute weight change due to the hydrogen uptake at 77 K. for carbon, 1% Pd/carbon and 5% Pd/carbon after identical activation and charging procedures. The role of pressure is not linear, however, and the effect of added pressure diminishes as pressure increases, although the total hydrogen uptake capacity increases with pressure.

Carpetis et al, mentioned earlier, discusses hydrogen adsorption on carbon at 77 K. and indicates a pressure dependence. These experimental results were obtained in the pressure range from 2 bar to 42 bar. Higher pressure seems to produce higher uptakes of hydrogen adsorption in carbon in a more linear fashion.

In a comparison of hydrogen storage on carbon and on MACS hydrogen at a given pressure was contacted with the carbon and with a 5% P+/C MACS, and weight gain was measured. The results as shown in Table 6 clearly indicate superior $H_2$ takeup for MACS at elevated pressures.

As discussed above, dry MACS shows 8.5% enhancement compared to carbon alone at 85 K. (Table 1). On wet MACS, the hydrogen is also continuously adsorbed at a rate of 1.13 gm $H_2$ per hour per kilogram of MACS medium after the final equilibrium temperature of 85 K. is reached, so significantly more hydrogen is stored.

Figure 8:
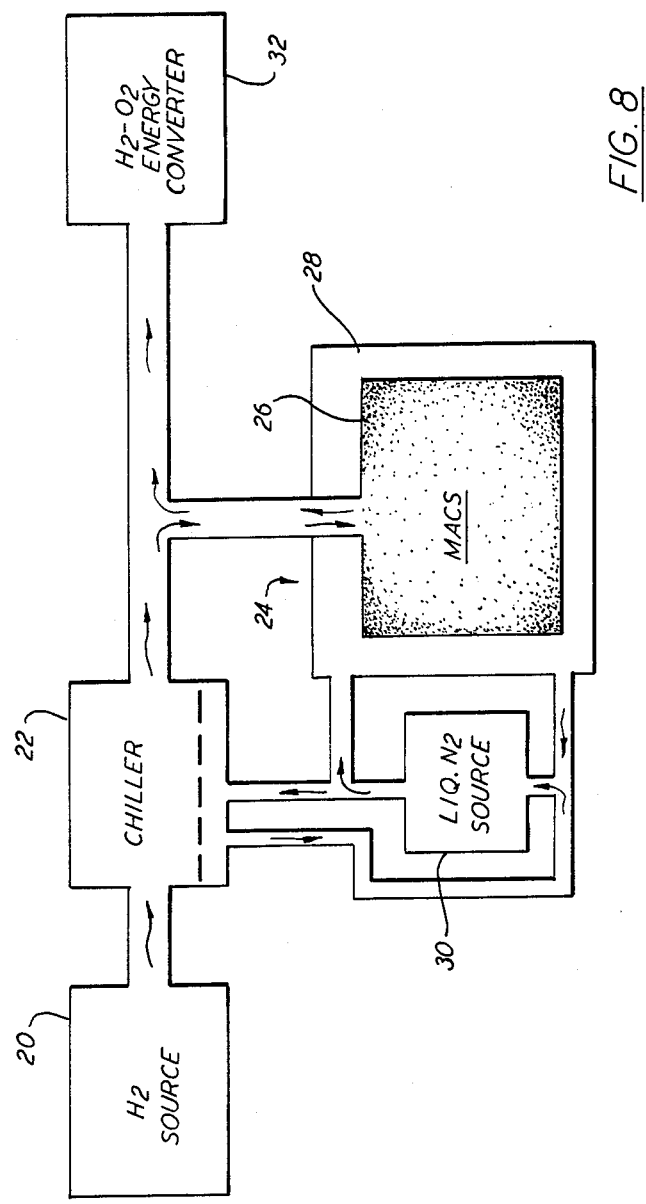
FIG. 8 is a schematic system diagram of storage apparatus according to an embodiment of the invention.

Apparatus according to this invention are shown schematically in FIG. 8. Here a hydrogen source 20, for example a cathode of an electrolytic cell, supplies hydrogen gas through a chiller 22 to a previously activated storage cell 24. The latter has an inner vessel 26 filled with a MACS material, for example nickel-zeolite or palladium-carbon. An outer jacket 28 surrounds the inner vesel and can be filled with a refrigerant or with a liquefied inert gas or liquid nitrogen to keep the MACS material in the desired cold temperature range. Here, a liquid nitrogen source 30 cycles nitrogen to the chiller 22 and to the jacket 28 of the storage cell 24. The hydrogen is supplied, either directly from the source 20 or indirectly after having been released from storage in the cell 24, to an energy converter 32. The latter can be e.g., a fuel cell which combines the hydrogen with oxygen to produce electricity, or can be a turbine or internal combustion engine.

While examples of suitable MACS substances have been specifically discussed, and for hydrogen storage at certain temperatures, it will become apparent that many variations and modifications can be made as to the materials used and the operating conditions with which employed, without departure from the scope and spirit of the invention as defined in the appended claims.

TABLE 1

Summary of Storage Results

| | Activated Carbon (Engelhard) | |
|---|---|---|
| | 77K (four hour charge) | 85K (20 minute charge) |
| gm $H_2$/kg. catalyst: | 14.5 ± 0.95 | 13.0 |

| | Dry | | Wet | |
|---|---|---|---|---|
| | 1% Pd/Carbon | | | |
| | 77K (4-hr. charge) | 85K (20 min. charge) | 77K (4-hr. charge) | 85K (20 min. charge) |
| gm $H_2$/kg. cat.: | 15.3 ± 0.86 | 14.0 | 20.3 | 15.1 |
| % Enhancement: | 6% | 8% | 40% | 16% |
| | 5% Pd/Carbon | | | |
| | 77K (4-hr. charge) | 85K (20 min. charge) | 77K (4-hr. charge) | 85K (20 min. charge) |
| gm $H_2$/kg. cat.: | 15.2 ± 0.34 | 14.4 | 21.9 ± 0.87 | 16.2 |
| % Enhancement: | 5% | 11% | 51% | 25% |
| | 5% Pt/Carbon | | | |
| | 77K (4-hr. charge) | 85K (20 min. charge) | 77K (4-hr. charge) | 85K (20 min. charge) |
| gm $H_2$/kg. cat.: | 15.9 ± 1.25 | 14.1 | 19.1 ± 1.87 | 15.5 |
| % Enhancement: | 10% | 8% | 32% | 19% |

NOTE:
Results where standard deviations are reported were from more than 8 replicate experiments; results where standard deviations are not reported were from between 1-3 replicate experiments.

TABLE 2

Physicochemical Properties of Activated Carbon and 5% Pd/C

| | BET | Metal Area | % Metal | % H O |
|---|---|---|---|---|
| C | 1175 m/g | — | — | 7% |
| Pd/C | 1167 m/g | 8.2 m/g | 4.83% | 54% |

TABLE 3

Water Entrainment

| | Water Produced mg/kg sample | Water Entrained mg/kg sample |
|---|---|---|
| 1% Pd/carbon | 1.02 | 0.52 |

TABLE 3-continued

| | Water Entrainment | |
|---|---|---|
| | Water Produced mg/kg sample | Water Entrained mg/kg sample |
| 5% Pd/carbon | 2.49 | 0.62 |

TABLE 4

BET area of activated carbon=1167 $m^2$/gm
Surface area of Pd supported on carbon=8.2 $m^2$/gm
Total amount of Pd=4.82% by weight
Diameter of hydrogen atom=1.1 A
Diameter of Pd atom=2.75 A
Atomic weight of Pd=106.4
Hydrogen uptake on carbon=14.5 gm/kg of Pd/C
Hydrogen uptake on Pd/carbon=20.3 gm/kg of Pd/C The number of Pd atoms=$2.73 \times 10(20)$ atoms/gm of Pd/C
The number of surface atoms=$1.35 \times 10(20)$ atoms/gm of Pd/C
The total number of atoms adsorbed in Pd=0.677 gm atoms/kg Pd/C
The total hydrogen adsorbed due to Pd=5.80 gm/kg Pd/C
The total number of atoms spilled over=$3.09 \times 10(24)$ atoms/kg Pd/C
The total hydrogen adsorbed due to support=4.37 molecules/kg Pd/C
The number of sites accommodated=7.46 sites/kg of Pd/C
The total number of available sites=$5.75 \times 10(25)$ sites/kg of Pd/C

TABLE 5

| | Kinetic Parameters | |
|---|---|---|
| | Adsorption | Desorption |
| Carbon | $E_a = 1.54$ Kcal/mole | $E_d = 1.76$ Kcal/mole |
| | $A_a = 1.1 \times 10^{-5}$ mole/sec | $A_d = 1.9 \times 10^{-6}$ mole/sec |
| 1% Pd/C | | |
| 77K~160K | $E_a = 1.08$ Kcal/mole | $E_d = 1.11$ Kcal/mole |
| | $A_a = 6.8 \times 10^{-5}$ mole/sec | $A_d = 2.8 \times 10^{-5}$ mole/sec |
| 160K~373K | $E_a = 2.74$ Kcal/mole | $E_d = 6.81$ Kcal/mole |
| | $A_a = 5.6 \times 10^{-7}$ mole/sec | $A_d = 1.0 \times 10^{-12}$ mole/sec |
| 5% Pd/C | | |
| 77K~160K | $E_a = 0.78$ Kcal/mole | $E_d = 0.83$ Kcal/mole |
| | $A_a = 1.5 \times 10^{-4}$ mole/sec | $A_d = 6.1 \times 10^{-5}$ mole/sec |
| 160K~373K | $E_a = 2.57$ Kcal/mole | $E_d = 5.2$ Kcal/mole |
| | $A_a = 8.3 \times 10^{-7}$ mole/sec | $A_d = 2.8 \times 10^{-12}$ mole/sec |

TABLE 6

| Pressure (atm) | $H_2$ take-up: (gm/kg carbon) Carbon | $H_2$ take-up: (gm/kg MACS) 5% P+/C |
|---|---|---|
| 1 | 16.66 | 16.73 |
| 5 | 25.99 | 27.39 |
| 10 | 31.31 | 35.90 |
| 15 | 35.87 | 42.41 |
| 20 | 39.04 | 48.50 |
| 25 | 41.30 | no data |
| 30 | 44.15 | 59.76 |
| 35 | 46.66 | 65.22 |
| 40 | 49.25 | 70.36 |

What is claimed is:

1. A method of storing hydrogen by sorption on a composite formed of carbon and a transition metal, comprising the steps of
    contacting gaseous hydrogen with a storage medium formed of high surface area activated carbon combined with an active transition metal in elemental form capable of dissociating the hydrogen,
    physisorbing the hydrogen on the storage medium, and
    storing the sorbed hydrogen by maintaining the pressure at or above one bar and maintaining the temperature of the medium in a cold temperature range below 293 K.

2. The method of claim 1 wherein said transition metal is dispersed in said carbon as small particles in the size range of about 50–200 Å.

3. The method of claim 1 wherein said transition metal is selected from group VIII transition metals.

4. The method of claim 3 wherein said transition metal is selected from the family consisting of Ni, Pd, and Pt.

5. The method of claim 3 wherein said transition metal is selected from the family consisting of Co, Rh, and Ir.

6. The method of claim 3 wherein said transition metal is selected from the family consisting of Fe, Ru, and Os.

7. The method of claim 1 wherein said storage medium consists of activated carbon and 5% by weight of said transition metal.

8. The method of claim 1 wherein said activated carbon has a surface area factor of at least 1000 $m^2$/g.

9. The method of claim 1, further comprising preparing the storage medium prior to said contacting with hydrogen, by flowing an inert gas through said medium for dehydrating the same.

10. The method of claim 9 wherein said preparing includes flowing hydrogen for a period of time at about 373 K., then flowing said inert gas over said medium for an additional period of time at about 373 K., and then cooling the storage medium to a temperature in said cold temperature range.

11. The method of claim 1 wherein said maintaining the temperature in the cold temperature range includes cooling said medium with liquid nitrogen.

12. The method of claim 1 wherein said high surface area activated carbon has a pH that is basic.

13. The method of claim 12 wherein said carbon has a pH of between about 9 and 10.

14. The method of claim 1 wherein said maintaining the pressure is carried out for a charging interval of about four hours.

15. The method of claim 14 wherein said pressure is maintained at about 40 bars.

16. The method of claim 1 wherein said pressure is maintained below about 50 bars.

17. The method of claim 16 wherein said pressure is maintained between one and twelve bars.

18. The method of claim 17 wherein said pressure is maintained at about one atmosphere.

19. Storage apparatus for storing hydrogen in sorbed form, a comprising a pressure vessel having a port for receiving and discharging the hydrogen;
    cooling means for maintaining said vessel at a temperature in a cold temperature range; and a fill of a storage medium that consists of high surface area activated carbon combined with an active transition metal in elemental form capable of dissociating the hydrogen.

20. The storage apparatus of claim 19, wherein said pressure vessel is capable of sustaining a pressure of at least about 100 atmospheres.

21. The storage apparatus of claim 19, wherein said cooling means includes means for cooling said storage medium to or near liquid nitrogen temperatures.

22. The storage apparatus of claim 19, wherein said transition metal is a metal selected from the group VIII transition metals.

23. The storage apparatus of claim 19, wherein said transition metal is selected from the family consisting of Ni, Pd, and Pt.

24. The storage apparatus of claim 19, wherein said transition metal is selected from the family consisting of Co, Rh, and Ir.

25. The storage apparatus of claim 19, wherein said transition metal is selected from the family consisting of Fe, Ru, and Os.

26. The storage apparatus of claim 19 wherein said storage medium consists of activated carbon and 5% by weight of said transition metal.

27. The storage apparatus of claim 19 wherein said activated carbon has a surface area factor of at least about 1000 $m^2/g$.

28. The storage apparatus of claim 27 wherein said pH is between about 9 and 10.

29. The storage apparatus of claim 19 wherein said activated carbon has a pH that is basic.

* * * * *